US011663806B2

(12) United States Patent
Jagadeesh et al.

(10) Patent No.: US 11,663,806 B2
(45) Date of Patent: May 30, 2023

(54) SALIENCY OF AN OBJECT FOR IMAGE PROCESSING OPERATIONS

(71) Applicant: Apple Inc., Cupertino, CA (US)

(72) Inventors: Vignesh Jagadeesh, San Jose, CA (US); Yingjun Bai, San Jose, CA (US); Guillaume Tartavel, Paris (FR); Gregory Guyomarc'h, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/659,377

(22) Filed: Apr. 15, 2022

(65) Prior Publication Data

US 2022/0237887 A1 Jul. 28, 2022

Related U.S. Application Data

(63) Continuation of application No. 16/848,315, filed on Apr. 14, 2020, now Pat. No. 11,308,345.

(60) Provisional application No. 62/855,577, filed on May 31, 2019.

(51) Int. Cl.
*G06F 18/214* (2023.01)
*G06V 10/20* (2022.01)
*G06V 10/46* (2022.01)
*G06V 20/64* (2022.01)

(52) U.S. Cl.
CPC .......... *G06V 10/255* (2022.01); *G06F 18/214* (2023.01); *G06V 10/462* (2022.01); *G06V 20/64* (2022.01)

(58) Field of Classification Search
None
See application file for complete search history.

(56) References Cited

U.S. PATENT DOCUMENTS

| 8,401,292 | B2 | 3/2013 | Park |
| 8,577,156 | B2 | 11/2013 | Stankiewicz |
| 10,033,918 | B2 | 7/2018 | Eslami |
| 10,504,240 | B1 * | 12/2019 | Solh ........................ H04N 9/045 |
| 11,023,730 | B1 * | 6/2021 | Zhou ..................... G06K 9/6256 |

(Continued)

OTHER PUBLICATIONS

Najibi, et al., "AutoFocus: Efficient Multi-Scale Inference," arXiv, Dec. 4, 2018.

*Primary Examiner* — Idowu O Osifade
(74) *Attorney, Agent, or Firm* — Blank Rome LLP

(57) ABSTRACT

Various methods for utilizing a saliency heatmaps are described. The methods include obtaining image data corresponding to an image of a scene, obtaining a saliency heatmap for the image of the scene based on a saliency network, wherein the saliency heatmap indicates a likelihood of saliency for a corresponding portion of the scene, and manipulating the image data based on the saliency heatmap. In embodiments, the saliency heatmap may be produced using a trained machine learning model. The saliency heatmap may be used for various image processing tasks, such as determining which portion(s) of a scene to base an image capture device's autofocus, auto exposure, and/or white balance operations upon. According to some embodiments, one or more bounding boxes may be generated based on the saliency heatmap, e.g., using an optimization operation, which bounding box(es) may be used to assist or enhance the performance of various image processing tasks.

20 Claims, 6 Drawing Sheets

(56) References Cited

U.S. PATENT DOCUMENTS

2018/0060701 A1* 3/2018 Krishnamurthy .... G06K 9/6255
2019/0114743 A1* 4/2019 Lund .................... G06N 3/0454
2019/0370587 A1* 12/2019 Burachas ............... G06F 16/53
2020/0279124 A1* 9/2020 Huang ................. G06K 9/4671
2020/0372610 A1* 11/2020 Lund ................. G06K 9/00456

* cited by examiner

SALIENCY OF AN OBJECT FOR IMAGE PROCESSING OPERATIONS

BACKGROUND

This disclosure relates generally to the field of digital image capture, and more particularly to the training and utilization of object saliency machine learning models to assist in various image processing tasks, such as autofocus, auto exposure, and/or white balance operations.

With the proliferation of camera-enabled mobile devices, users can capture numerous photos of any number of people and objects in many different settings and geographic locations. For example, a user may take and store hundreds of photos and other media items on their mobile device. However, difficulties can arise in determining what portion of an image is important, or "salient" to a viewer of the image. For example, image processing often requires determining what portion of an image a user might find relevant or important to their understanding or appreciation of the content of the image.

SUMMARY

In one embodiment, a method for utilizing a saliency heatmap is described. The method includes obtaining image data corresponding to an image of a scene, obtaining a saliency heatmap for the image of the scene based on a saliency network, wherein the saliency heatmap indicates a likelihood of saliency for a corresponding portion of the scene, and manipulating the image data based on the saliency heatmap. The saliency heatmap may be used for various image processing tasks, such as determining which portion(s) of a scene to base an image capture device's autofocus operations upon. According to some embodiments, one or more bounding boxes may also be generated based on the saliency heatmap, e.g., using an optimization operation, which bounding box(es) may also be used to assist or enhance the performance of various image processing tasks.

In another embodiment, the method may be embodied in computer executable program code and stored in a non-transitory storage device. In yet another embodiment, the method may be implemented in an electronic device, such as an image capture device.

DETAILED DESCRIPTION

Figure 1:
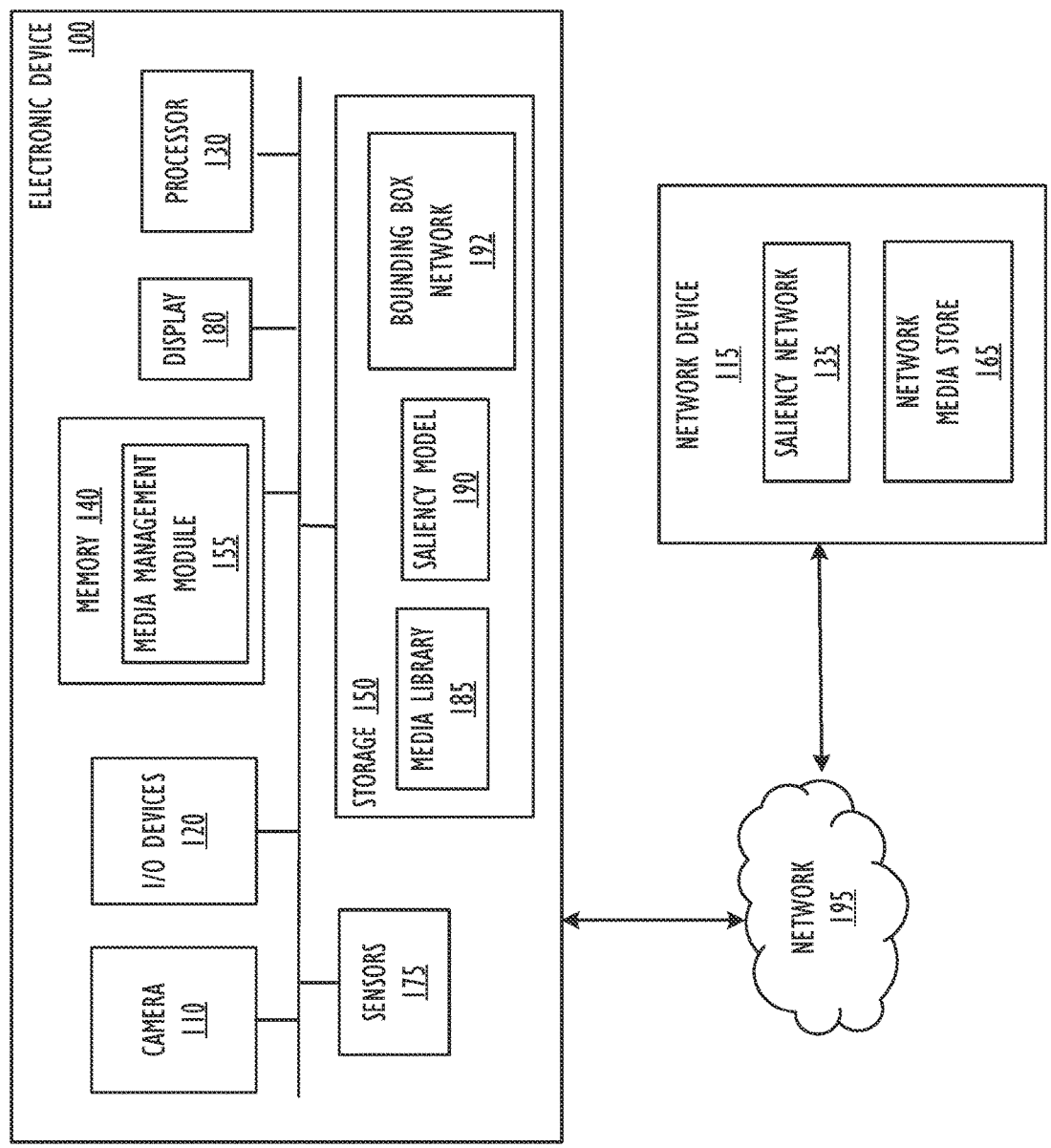
FIG. 1 shows, in block diagram form, a simplified electronic device according to one or more embodiments.

This disclosure pertains to systems, methods, and computer readable media for technique for detecting a salient object(s) in an image, e.g., in the form of a saliency heatmap, and utilizing the saliency heatmap for various image processing tasks, such as determining which portion(s) of a scene to base an image capture device's autofocus operations upon. According to some embodiments, one or more bounding boxes may also be generated based on the saliency heatmap, e.g., using an optimization operation, which bounding box(es) may also be used to assist or enhance the performance of various image processing tasks, such as object tracking, auto focus, auto exposure, portrait mode, and the like.

Initially, a saliency network may be trained to predict salient objects appearing in a captured image scene in a class-agnostic manner. That is, saliency is predicted without identifying what type of object the salient object is. In one or more embodiments, the described technique for determining saliency of an object is a variant of foreground segmentation. The output of the saliency network may be a heatmap, which indicates a salience value for each pixel (or group of pixels) with respect to their estimated saliency to a viewer of the image. In some embodiments, the saliency heatmap may be used to weight autofocus statistics. Further, in some embodiments, the saliency heatmap may be utilized to generate a bounding box(es) around salient objects. For purposes of this description, a salient object refers to an object of interest in an image, and a saliency value refers to a likelihood that a particular pixel belongs to a salient object.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram or flow chart is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an electronic device 100 is depicted in accordance with one or more embodiments of the disclosure. Electronic device 100 may be part of a multifunctional device such as a mobile phone, tablet computer, personal digital assistant, portable music/video player, or any other electronic device that includes a camera system. Further, electronic device 100 may be part of a larger system of components that includes a camera 110 and a display 180. Electronic Device 100 may be connected to other devices across a network such as network device 115, and/or other mobile devices, tablet devices, desktop devices, as well as network storage devices such as servers and the like. Electronic device 100 may be configured to capture image data corresponding to a scene and use the captured image data to render views on a display 180 viewable by a user.

Electronic device 100 may include one or more sensors 175, which may provide information about a surrounding environment, such as contextual information. For example, sensors 175 may include sensors configured to detect brightness, depth, location, and other information regarding the environment. Electronic device 100 may also include a display 180, which may be an additive display. For example, display 180 may be a transparent or semi-opaque display, such as a heads-up display, by which an image may be projected over a transparent surface. Thus, display 180 may be comprised of a projector and a surface, or may just include the projector. Further, display 180 may be a transparent display, such as an LCD display and/or a head mounted display. Electronic device 100 may additionally include I/O devices 120, such as speakers and the like. In one or more embodiments, the various I/O devices 120 may be used to assist in image capture. According to one or more embodiments, I/O devices 120 may additionally include a touch screen, mouse, track pad, and the like.

Electronic device 100 may include a processor 130. Processor 130 may be a central processing unit (CPU). Processor 130 may alternatively, or additionally, include a system-on-chip such as those found in mobile devices and include zero or more dedicated graphics processing units (GPUs). Electronic device 100 may also include memory 140 and storage 150. Memory 140 and storage 150 may each include one or more different types of memory, which may be used for performing device functions in conjunction with processor 130. For example, memory 140 may include cache, ROM, and/or RAM. Memory 140 may store various programming modules during execution, including media management module 155. In one or more embodiments, storage 150 may comprise cache, ROM, RAM, and/or non-volatile memory, and may store media items in a media library 185. Media library 185 may include various types of media items, such as image files, video files, audio files, enhanced image files, and the like. An enhanced image may include a "snapshot image", a first subset of image from a pre-capture image sequence, and a second subset of image from a post-capture image sequence, and wherein the first and second subsets of images may be played back as a video sequence (which may also include the snapshot image itself). The enhanced image may include a concurrently captured audio recording, according to one or more embodiments. Further, according to one or more embodiments, media library 185 may include a combination of types of media items. Media library 185 may include, for example, images captured by camera 110, as well as images received by electronic devices 100, for example by transmission.

Storage 150 may also include a saliency model 190 according to one or more embodiments. The saliency model 190 may include a trained saliency network, by which saliency of an object may be predicted for an image. In one or more embodiments, the saliency model 190 may be trained with still image data or video data and may be trained to predict the salience of various objects in the image. According to one or more embodiments, training on video data may provide motion information such that the saliency model may be trained for temporal consistency. The saliency model 190 may be trained in a class-agnostic manner. That is, the type of object may be irrelevant in the saliency network, which may only be concerned with whether or not a particular object is salient. Further, and one or more embodiments, the saliency network may be trained on RGB image data, and/or RGB+Depth image data. According to one or more embodiments, by incorporating depth into the training data, a more accurate saliency heatmap may be generated. As an example, depth may be used to identify object boundaries, layout of the scene, and the like.

In one or more embodiments, the trained saliency network may take as input an image and output a saliency heatmap indicating a likelihood of whether a particular portion of the image that is associated with a salient object. Further, in one or more embodiments, the trained saliency network 190 may additionally output a bounding box indicating a region of the heatmap that is salient. In one or more embodiments, the saliency model 190 may incorporate, or feed into, a bounding box network 192. The bounding box network 192 may predict the dimensions and/or locations of the bounding box, and/or may be used to determine the dimensions and/or locations of the bounding box by solving an optimization problem, as described in further detail below with regard to Equation 1.

According to one or more embodiments, the training images may be annotated with segmentation masks, which may provide pixelized contours of objects in an image. The segmentation masks may identify a foreground object that is likely to be salient. The saliency network may be trained to predict a mask on an unmarked image. As such, saliency of an object is a variant of foreground segmentation.

The output of the saliency network may also be referred to herein as a "heatmap," in which the value associated with a pixel or portion of the image indicates a likelihood of the saliency of corresponding pixel or portions of the image. For example, the higher the value is in the saliency heatmap for a given pixel, the greater the likelihood that the given pixel is part of a salient object. The heatmap may alternatively be generated on a downsampled image, such that each portion of pixels is given an estimated saliency value in the heatmap.

In some cases, the saliency model 190 and/or the bounding box network 192 may be trained with optical flow for better temporal stability across frames. Optical flow may be computed between frames of video training data. Motion estimation may be determined and the network may be constrained to have consistency between images at time t and time t+2, for example. Performing motion estimation may limit the jittering of the saliency heatmap across frames.

Memory 140 may include instructions, such as computer readable code executable by processor 130 to perform various actions. For example, media management module 155 may include instructions that cause electronic device 100 to assist in managing media items captured by camera 110. Media management module 155 may manage media items captured, for example by camera 110, by storing captured media items, such as image files, video files, audio files, enhanced image files, and the like, such has those stored in media library 185. In one or more embodiments, additional data may be used to "tag" the images, such as geographic location, recognized faces or objects, date, time, and the like. Further, in one or more embodiments, media management module 155 may perform image processing techniques on the image data. For example, the media management module 155 may utilize the saliency heatmap for such processes as autofocus, object tracking, portrait mode, and the like.

According to one or more embodiments, the electronic device 100 may utilize resources of a network device 115. For example, the network device 115 may include storage or processing resources which may be utilized. Although network device 115 is depicted as a single device, it should be understood that network device 115 may be comprised of multiple devices. Further, the various components and modules described as being performed or hosted by network device 115 may be distributed across multiple network device 115 in any manner. Moreover, according to one or more embodiments, the various modules and components described as being hosted by network device 115 may alternatively or additionally be hosted by electronic device 100.

In one or more embodiments, network device 115 may include a network media store 165, in which images may be stored on network storage. Further, network device may include a global saliency network 135. According to one or more embodiments, the global saliency network 135 may accessible to remote devices such as electronic device 100.

Figure 2:
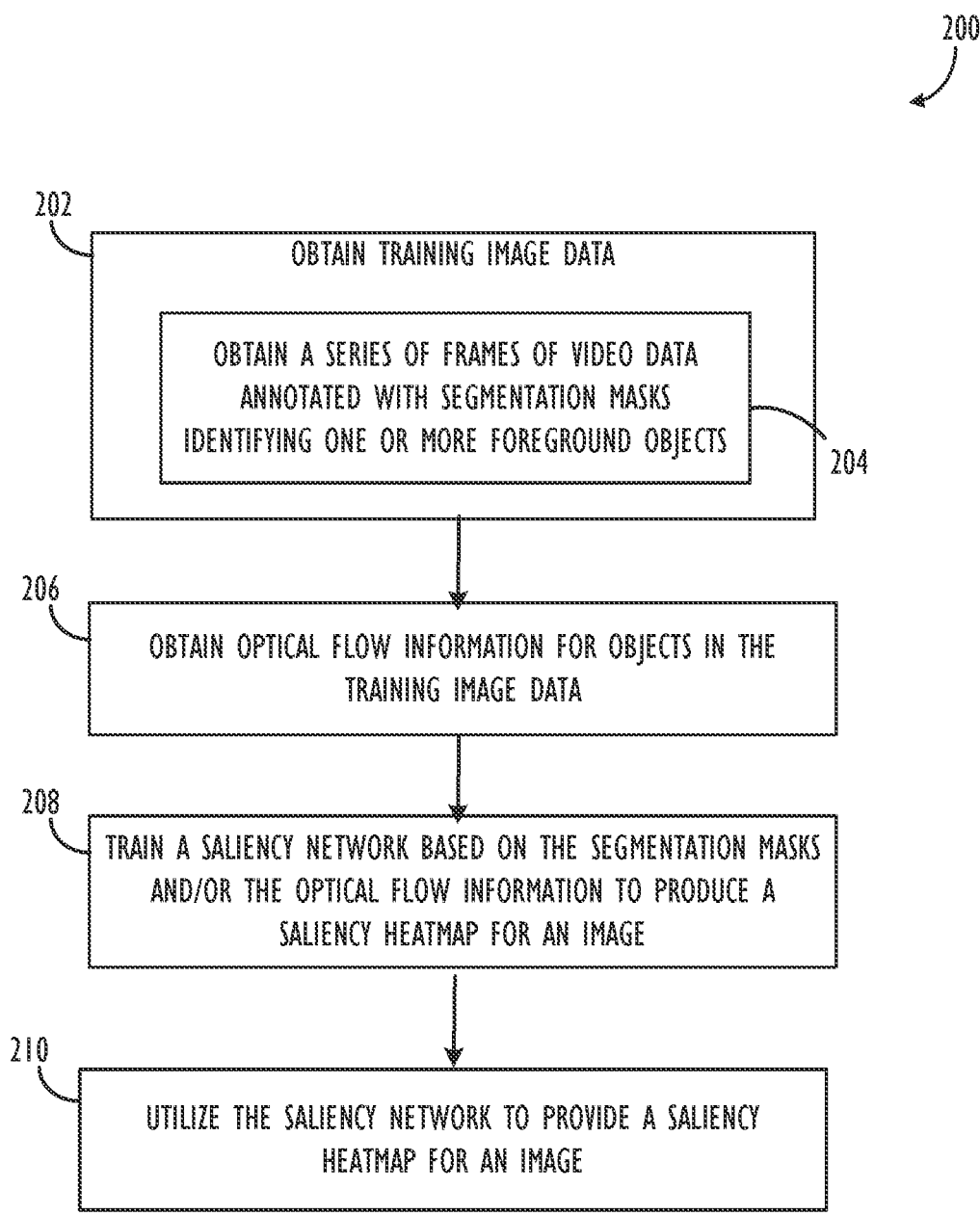
FIG. 2 shows, in flowchart form, a method for training a saliency network to generate a saliency heatmap for an image, according to one or more embodiments.

FIG. 2 shows, in flowchart form, an overview of a method 200 for utilizing a saliency network to provide a saliency heatmap for an image, according to one or more embodiments. With respect to each of the flowcharts described below (e.g., FIGS. 2-4), although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

Flowchart 200 begins at block 202, where media management module 155 obtains training image data. According to one or more embodiments the training image data may include images that are annotated with segmentation masks, which provide pixel contours of objects in the image. According to one or more embodiments, the segmentation masks may be obtained utilizing foreground segmentation and may identify foreground object which are considered to be salient. As depicted at block 204, the media management module 155 may obtain a series of frames of video data annotated with the segmentation masks identifying one or more foreground objects. That is, the training data may be obtained from a series of video frames, or still images.

The flowchart 200 continues at block 206, where the media management module 155 contains optical flow information for objects in the training image. According to one or more embodiments, optical flow may be computed from video clips, for example from block 204. Optical flow may provide motion estimation in order to constrain a saliency network to avoid predicting arbitrary heatmaps for a particular frame. Specifically, the consistency of heatmaps may be improved over time. As an example, if almost nothing changes throughout the video, the heatmap should remain fairly stable, and should not have large variations of the heatmaps for the individual frames. As such, jittering over time in the heatmaps may be avoided.

At block 208, the media management module 155 train the saliency network based on the segmentation masks and or the optical flow information to produce a saliency heatmap for an image. As described above, the image may include a particular frame of a series of frames of video data, or maybe a still image. Further, the image may be any kind of image as described above. In one or more embodiment, the trained images may provide saliency information for a particular pixel, set of pixels, tile, or the like.

The flowchart concludes at block 210, where the media management module utilizes the saliency network to provide a saliency heatmap for an image. That is, once the saliency network is trained, a new image may be input into the saliency network and the saliency network may provide a heatmap for the input image. In one or more embodiments, the heatmap for the image indicates a likelihood that a particular portion of the image, such as a pixel, group of pixels, a tile, or the like, contain a salient object.

Figure 3:
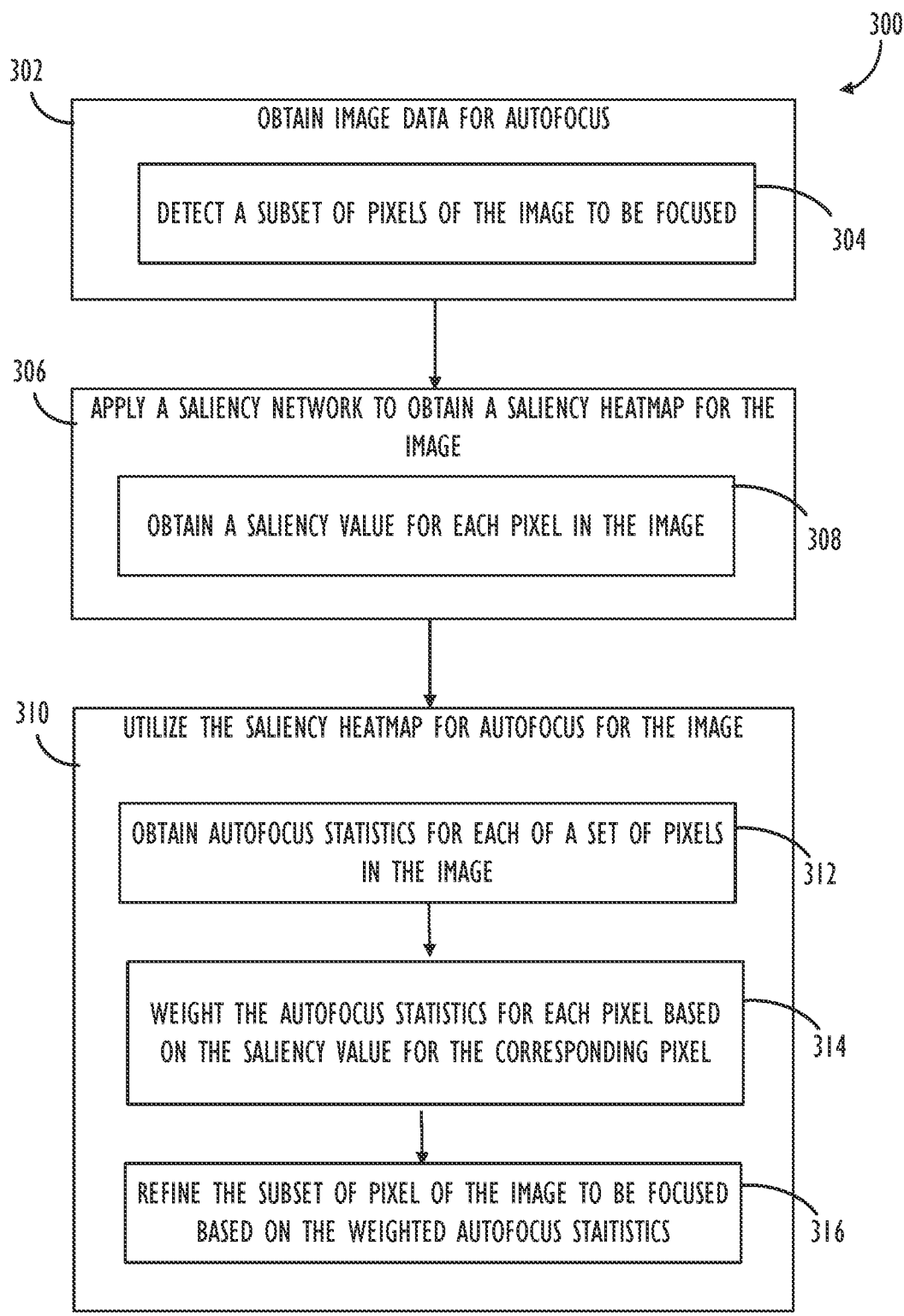
FIG. 3 shows, in flowchart form, a method for utilizing the saliency heatmap for autofocus, according to one or more embodiments.

FIG. 3 shows, in flowchart form, a method 300 for utilizing a saliency heatmap for autofocus. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1.

The flowchart 300 begins at block 302, where the media management module 155 obtains image data for autofocus. According to one or more embodiments, the media management module 155 may obtain preview data captured by a camera during the image capture process. According to one or more embodiments, the media management module may, at block 304, detect a subset of pixels of the image to be focused. For example, the media management module 155 may identify the user selected subset of pixels of the preview data which should be the subject of autofocus, such as in a tap to focus technique. According to normal embodiments, the image data for the image may correspond to image frames of preview data during an image capture process. As another example, the image data may be downsampled, such that saliency information for a particular pixel in a downsampled image corresponds to a set of pixels in a raw image.

The flowchart continues at block 306, where the media management module 155 applies a saliency network to obtain a saliency heatmap for the image. As an example, the media management module 155 may utilize the saliency model 190 to determine a saliency heatmap for the particular image. According to one or more embodiments, at 308, the media management module 155 obtains a saliency value for each pixel (or group of pixels) in the image. In one or more embodiments, the saliency value may indicate a likelihood that the image portion (e.g., the pixel or set of pixels) includes a salient object. Thus, in one or more embodiments, the saliency value may comprise a normalized value of, for example, between zero and one. However, it should be understood that the saliency value may be represented in alternative manners.

At 310, the media management module 155 utilizes the saliency heatmap for autofocus for the image. That is, because the saliency value may indicate a likelihood that a particular pixel, set of pixels, portion of an image, or the like is associated with a salient object in the image, autofocus statistics may be weighed more heavily for portions of the image associated salient objects. For example, sharpness, phase detection, and other image characteristics may be weighted based on the saliency values. Thus, by incorporating consideration of the salient values for the image, and autofocus pipeline may be more likely to correctly focus the salient portion of the image. In one or more embodiments, utilizing the saliency heatmap may include, for example, at block 312, the media management module 155 obtaining autofocus statistics for each of a set of pixels in the image. In one or more embodiments, the media management module may obtain autofocus statistics for individual pixels, a tile of pixels, a subset of pixels, or the like.

The flowchart 300 concludes at block 316, wherein it refines the subset of pixels of the image to be focused, e.g., based on the weighted autofocus statistics. For example, the media management module 155 may identify a further subset of pixels of the image to be focused. In one or more embodiments, the media management module 155 may similarly utilize the saliency values to manipulate auto exposure and/or white balance settings for a given image. As another example, the media management module 155 may utilize the saliency heatmap and the weighted autofocus statistics to improve a bounding box identified by the electronic device 100 that is to be used in an image processing operation, such as the aforementioned autofocus, auto exposure, phase detection, tone mapping, white balancing operations, and the like. In one or more embodiments, the image processing operation may include image settings and/or camera settings. The identification of the optimal location and dimensions for a bounding box based on the use of a saliency heatmap will be described in further detail below with respect to FIG. 4.

Figure 4:
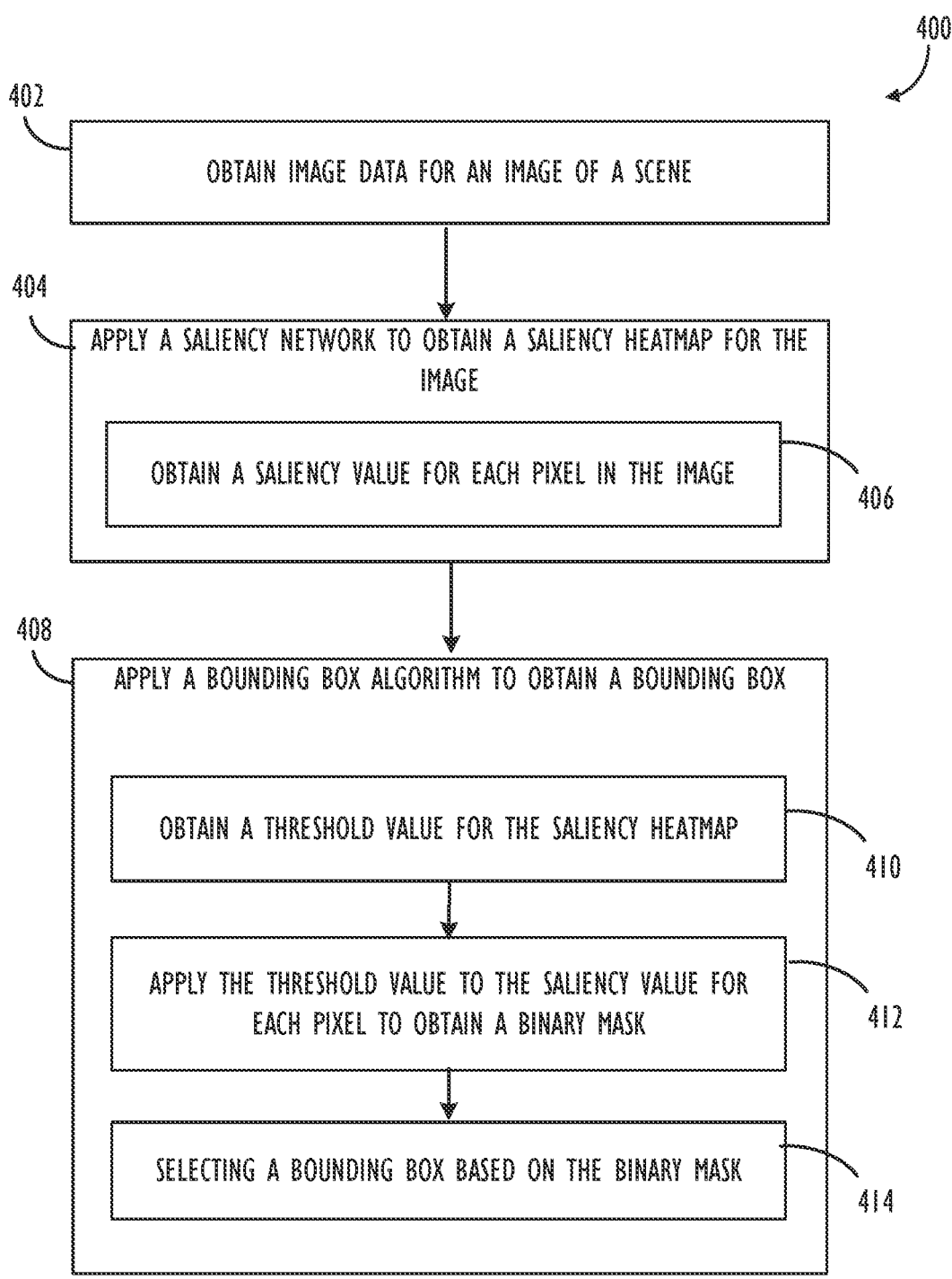
FIG. 4 shows an example flowchart depicting a method for utilizing the saliency heatmap for generating a bounding box for an image, according to one or more embodiments.

FIG. 4 shows a flowchart 400 for utilizing the saliency heatmap to generate a bounding box, according to one or more embodiments. Although the various actions are depicted in a particular order, in some embodiments, the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1.

The flowchart 400 begins at block 402, where the media management module 155 obtains image data for an image of a scene. In one or more embodiments, determining a bounding box encompassing one or more salient portions of the image data may be useful for the performance of various image processing tasks, for example for object tracking, auto focus, auto exposure, white balancing, portrait mode, and the like.

The flowchart continues at block 404, where the media management module 155 applies a saliency network to obtain a saliency heatmap for the image. As an example, the media management module 155 may utilize the saliency model 190 to determine a saliency heatmap for the particular image. At block 406, the media management module 155 weights autofocus statistics for each pixel (or set of pixels) based on the saliency value for the corresponding pixel (or set of pixels) from the saliency heatmap.

At block 408, the media management threshold 155 applies a bounding box algorithm to obtain the bounding box for the image. Applying the bounding box may include, for example, at block 410, obtaining a threshold value for the saliency heatmap. As described above, the saliency heatmap may provide, for each pixel and/or subset of pixels in the image, a saliency value that indicates a likelihood that the pixel and, or subset of pixels is part of the salient object in the image. The threshold value may be obtained in a variety of ways. For example, the threshold value may be obtained by identifying an average saliency value for the image. As another example, the threshold value may be determined as a higher or lower threshold value depending on the requisite tightness of the bounding box. For example, a higher threshold saliency value may identify only the most salient portions of the image. Alternatively, a lower threshold saliency value may identify a broader portion of the image. As yet another example, the threshold value may be simply determined as a predetermined saliency value, for example 0.5, indicating that the selected portions are more likely than not to be part of the salient object.

At 412, the media management module 155 may apply the threshold value to the saliency values for each pixel to obtain a binary mask. That is, for example, if the threshold saliency value is 0.5, all pixels associated with a saliency value over 0.5 will be assigned a one for the binary mask, whereas the remaining pixels will be assigned a zero for the binary mask. The flowchart 400 concludes at block 414, where the media management module selects the bounding box based on the binary mask. In one or more embodiments, the media management module 155 may select a bounding box such that a maximum portion of the pixels within the bounding box are salient pixels based on the saliency threshold value, for example.

In one or more embodiments, the saliency values for each pixel may be used directly to compute a bounding box. That is, a binary mask may not be generated, and the bounding box may be determined from the saliency values for each of the pixels or a set of pixels. Accordingly, in one or more embodiments, the bounding box may be determined directly from the heatmap rather than from a binary mask.

According to one or more embodiments, an x-min and x-max value may be determined for a salient object in the image based on the binary mask. Similarly, a y-min and y-max a may also be determined for the salient object in the image based on the binary mask. Further, in one or more embodiments, an optimization algorithm may be applied to maximize the bounding box.

To that end, another approach is to solve an optimization framework by attempting to maximize the following equation over the possible dimensions and possible result of locations of a bounding box, B, within a given image frame:

$$F(B) = \frac{1}{|B|^\alpha} \Sigma S_i^\gamma. \qquad \text{(Eqn. 1)}$$

That is, the term to be maximized is the sum of the saliency values from the saliency heatmap of all pixels, i, within a given boundary box, B, divided by the area of the boundary box B. S refers to the saliency heatmap. Alpha and gamma are tuning parameters that may be modified based on the needs of a given implementation. For example, alpha serves as a size tuning threshold for bounding box solution, wherein, e.g., a normalized alpha value of 0 will cause the bounding box, B, to take up the entire image, a normalized alpha value of 1 will cause the bounding box, B, to take up a very small portion of the image, and values of alpha between 0 and 1 will allow the user to tune their preferences as to how large the optimal bounding box, B, will be. The gamma parameter may be used in an analogous fashion as the alpha parameter, e.g., to tune the relative importance of the saliency heatmap value of the pixels within the bounding box relative to the size of the bounding box in the optimization framework. In one or more embodiments, the location and dimensions of the optimal bounding box, B, are solved for using an iterative gradient ascent algorithm. The algorithm requires an initial bounding box, which may be an initial box selected based on the binary mask or the saliency heatmap, or may be a predetermined default box, such as a center of the image, or may be based on the determined location and dimensions of the bounding box for a previous image frame, e.g., if the current image is part of a larger image sequence, such as a video sequence, for which optimal bounding boxes have been determined.

In other embodiments, a neural network or other machine learning model may be trained up to identify optimal bounding box locations based on input saliency heatmaps, such that the aforementioned heatmap thresholding and/or bounding box optimization problems would no longer need to be solved by the device. Instead, a neural engine or other dedicated processing device could simply utilize the network to produce the location and dimensions of an optimal bounding box, based on an input saliency heatmap.

In still other embodiments, multiple bounding boxes could be identified and then ordered or ranked, e.g., based on their likely importance or the confidence that the saliency map has in the respective region's salience, etc.

Figure 5:
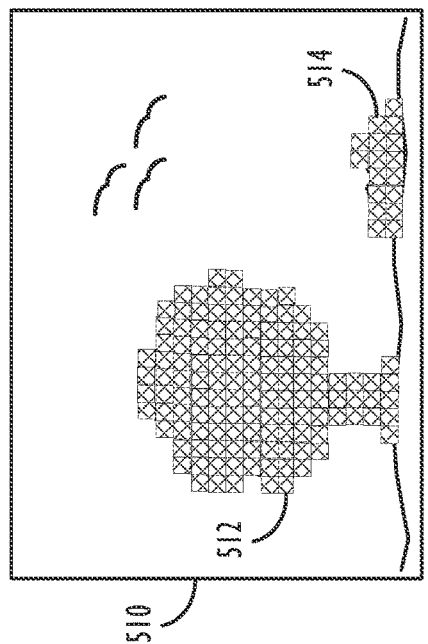
FIG. 5 shows an example frame in which a saliency heatmap is obtained and utilized to generate a bounding box, according to one or more embodiments.
Figure 5:
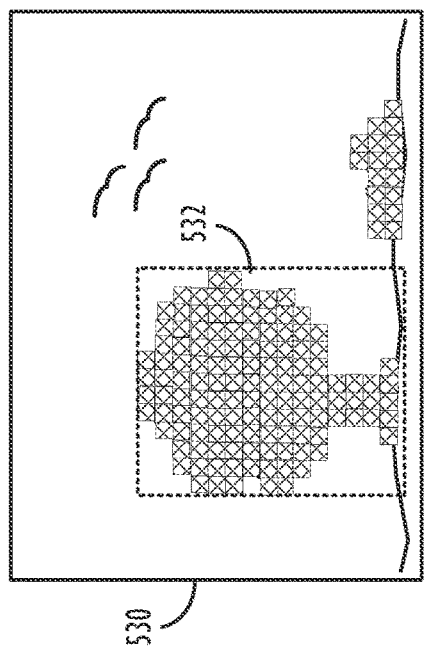
Figure 5:
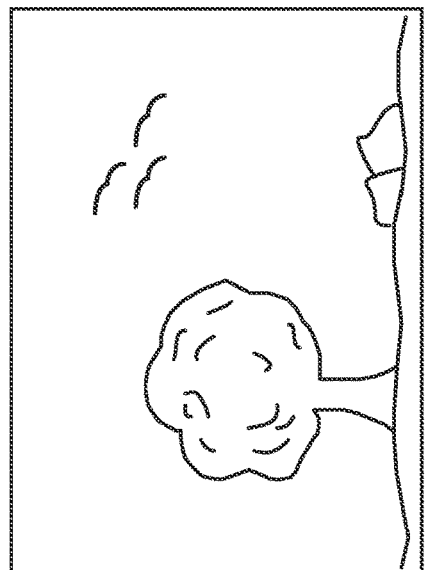
Figure 5:
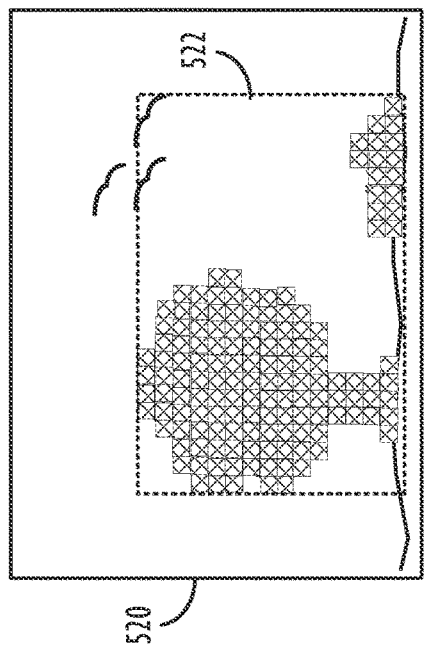

Turning to FIG. 5, a series of frames are presented which show the process of utilizing a saliency heatmap to generate a bounding box. Frame 500 depicts an image of a tree, some rocks, and some birds. According to one or more embodiments, the saliency network may be utilized to determine a saliency heatmap for the image. Thus, frame 510 depicts the frame 500 with the saliency heatmap overlaid. As is shown in frame 510, the saliency network may identify two potential salient objects, including the tree and the rocks. Thus, as shown, a salient area is identified at 512, and a salient area is identified at 514. Although not specified in the image, each pixel or set of pixels within the salient areas 512 and 514 may be associated with a saliency value. The saliency value, as described above, may indicate the likelihood that the pixel or set of pixels is part of a salient object. Accordingly, for purposes of this example, the tree and the rocks are identified as potentially salient objects.

Turning now to frame 520, initial bounding box 522 is depicted. As described above, initial bounding box may be applied such that it encompasses all potentially salient objects. According to one or more embodiments, a binary mask may be applied to the saliency values to determine salient objects in the image. For example, in frame 520, for purposes of this example, the pixels associated with the tree and the rocks may be associated with saliency values which satisfy a threshold for generating a binary mask. As such, the initial bounding box 522 encompasses both the tree and the rocks.

As described above, the bounding box algorithm may be an iterative algorithm in which the salient region is optimized. That is, the initial bounding box 522 may be increased or reduced in order to find an optimal bounding box. As such, bounding box 532 in frame 530 has been optimized to include only the tree and not the rocks. From here, the bounding box may be used for a number of purposes. For example, the bounding box 532 may be utilized for framing the image, object tracking, focus, and the like.

Figure 6:
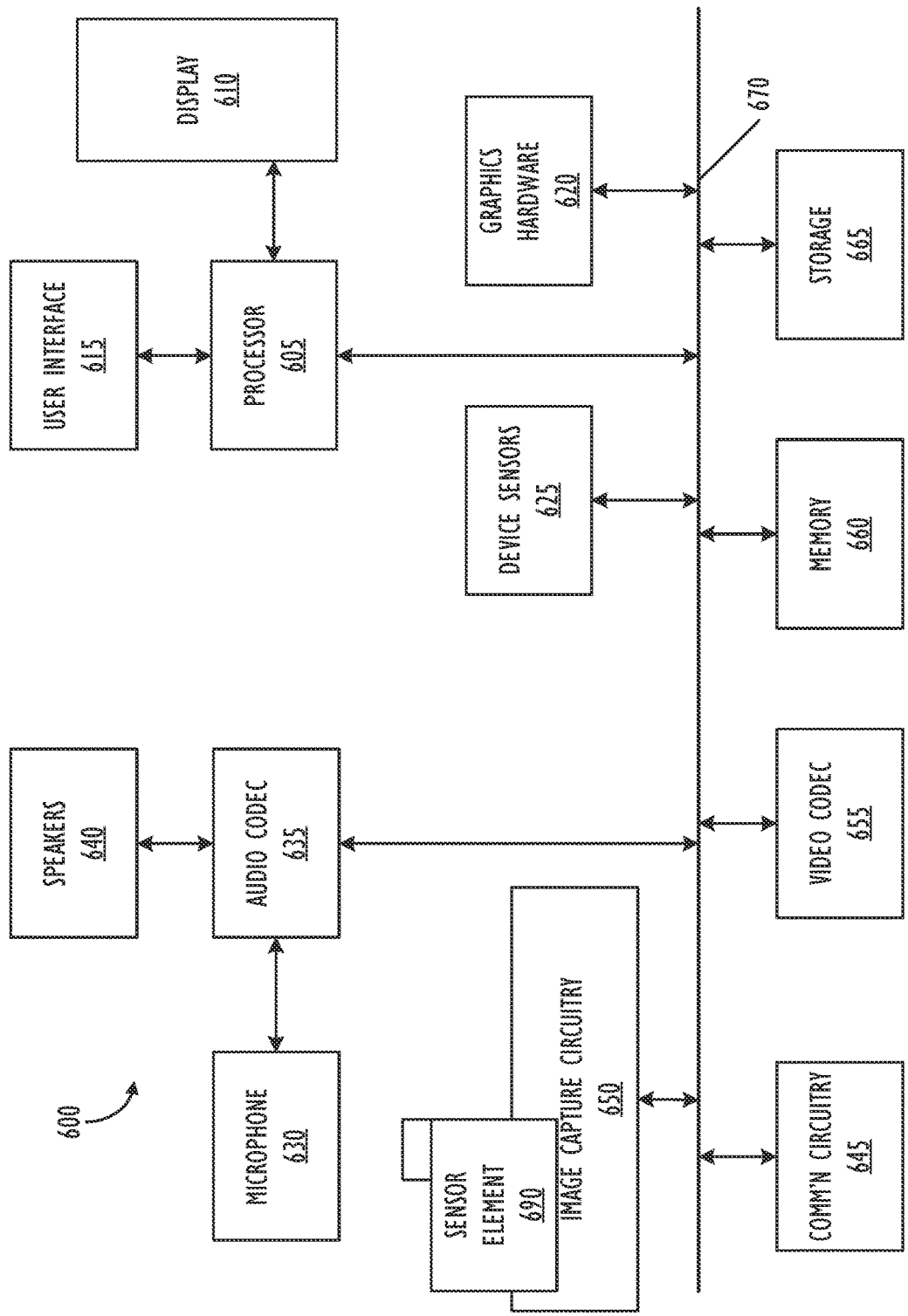
FIG. 6 shows, in block diagram form, a simplified multifunctional device according to one or more embodiments.

Turning to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650, video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680 associated with sensor element 690. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

As described above, one aspect of the present technology is the gathering and use of data available from various sources to generate models of people and to categorize image data. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to request and receive image data from remote users. Accordingly, use of such personal information data enables users to share information and communicate easily. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

The scope of the disclosed subject matter therefore should be determined with reference to the appended claims, along with the full scope of equivalents to which such claims are entitled.

The invention claimed is:

1. A non-transitory computer readable medium comprising computer readable code executable by one or more processors to:
   obtain image data corresponding to an image of a scene;
   determine, for each of a plurality of regions of an image, a saliency value to obtain a set of saliency values for the image, wherein the saliency value for each of the plurality of regions indicates a likelihood that an associated region corresponds to a class-agnostic salient object; and
   generate at least one bounding box for the image based on the set of saliency values for the image.

2. The non-transitory computer readable medium of claim 1, wherein the computer readable code to generate the at least one bounding box further comprises computer readable code to:
   apply the set of saliency values to a bounding box network.

3. The non-transitory computer readable medium of claim 2, wherein the computer readable code to apply the set of saliency values to a bounding box network further comprises computer readable code to:
   generate a binary mask for the image by applying a threshold value to each of the set of saliency values; and
   apply the binary mask to the bounding box network.

4. The non-transitory computer readable medium of claim 2, wherein the bounding box network has been trained to estimate a location of the at least one bounding box and a movement of the at least one bounding box over a series of frames comprising the image.

5. The non-transitory computer readable medium of claim 1, further comprising computer readable code to:
   rank the at least one bounding box based on saliency values associated with the at least one bounding box.

6. The non-transitory computer readable medium of claim 1, further comprising computer readable code to apply an optimization algorithm to at least one of the at least one bounding box to obtain one or more refined bounding boxes.

7. The non-transitory computer readable medium of claim 1, further comprising computer readable code to perform an image processing task on the image in accordance with the at least one bounding box.

8. A system comprising:
   one or more processors; and
   one or more computer readable media comprising computer readable code executable by the one or more processors to:
      obtain image data corresponding to an image of a scene;
      determine, for each of a plurality of regions of an image, a saliency value to obtain a set of saliency values for the image, wherein the saliency value for each of the plurality of regions indicates a likelihood that an associated region corresponds to a class-agnostic salient object; and
      generate at least one bounding box for the image based on the set of saliency values for the image.

9. The system of claim 8, wherein the computer readable code to generate the at least one bounding box further comprises computer readable code to:
   apply the set of saliency values to a bounding box network.

10. The system of claim 9, wherein the computer readable code to apply the set of saliency values to a bounding box network further comprises computer readable code to:
    generate a binary mask for the image by applying a threshold value to each of the set of saliency values; and
    apply the binary mask to the bounding box network.

11. The system of claim 9, wherein the bounding box network has been trained to estimate a location of the at least one bounding box and a movement of the at least one bounding box over a series of frames comprising the image.

12. The system of claim 8, further comprising computer readable code to:
rank the at least one bounding box based on saliency values associated with the at least one bounding box.

13. The system of claim 8, further comprising computer readable code to apply an optimization algorithm to at least one of the at least one bounding box to obtain one or more refined bounding boxes.

14. The system of claim 8, further comprising computer readable code to perform an image processing task on the image in accordance with the at least one bounding box.

15. A method for generating a bounding box, comprising:
obtaining image data corresponding to an image of a scene;
determining, for each of a plurality of regions of an image, a saliency value to obtain a set of saliency values for the image, wherein the saliency value for each of the plurality of regions indicates a likelihood that an associated region corresponds to a class-agnostic salient object; and
generating at least one bounding box for the image based on the set of saliency values for the image.

16. The method of claim 15, wherein generating the at least one bounding box further comprises:
applying the set of saliency values to a bounding box network.

17. The method of claim 16, wherein applying the set of saliency values to a bounding box network further comprises:
generating a binary mask for the image by applying a threshold value to each of the set of saliency values; and
applying the binary mask to the bounding box network.

18. The method of claim 16, wherein the bounding box network has been trained to estimate a location of the at least one bounding box and a movement of the at least one bounding box over a series of frames comprising the image.

19. The method of claim 15, further comprising applying an optimization algorithm to at least one of the at least one bounding box to obtain one or more refined bounding boxes.

20. The method of claim 15, further comprising performing an image processing task on the image in accordance with the at least one bounding box.

* * * * *